Patented May 24, 1949

2,471,266

UNITED STATES PATENT OFFICE 2,471,266

VINYL POLYMERS PLASTICIZED WITH AIR-BLOWN EXTRACTS OF MINERAL OIL FRACTIONS

Eric William Musther Fawcett, Eric Sylvester Narracott, and Kathleen Joan Rowland, Sunbury-on-Thames, England, assignors to Anglo-Iranian Oil Company Limited, London, England, a British joint-stock corporation No Drawing. Application December 22, 1944, Serial No. 569,418. In Great Britain December 22, 1943

6 Claims. (Cl. 260—29.1)

The invention relates to the production of a plasticised polyvinyl halide such as vinyl chloride or polyvinyl halide co-polymers such as polyvinyl chloride with co-polymers of vinyl acetate, methyl acrylate, vinylidene chloride or the like, adapted for use for example as coating compositions, cable dielectric compounds, and moulding compositions.

The use of substances of the character of tricresyl phosphate, dibutyl phthalate and dibenzyl sebacate as plasticisers for polyvinyl chloride or its co-polymers has long been practised. They are polar in character, and are thus known to have an adverse effect on the electrical and water resistant properties of the polymers. Their other physical properties, such for example as tensile strength are also known to depreciate rapidly with increasing additions of the plasticisers to these polymers.

In the specification filed pursuant to the application Serial No. 513,468, filed Dec. 8, 1943, a process is described for producing such compositions in the use as plasticisers or partial plasticisers, and/or fillers, of certain hydrocarbons obtained from mineral oil fractions by extraction with selective solvents of a polar character. These hydrocarbons are of molecular weight preferably within the range 250–750 and their initial and final boiling points are in the range 250–800° C. at 760 mm. Hg pressure. The preferred hydrocarbons are characterised by a high carbon content and their molecules contain on the average at least .6 atom of carbon per atom of hydrogen, and are generally unsaturated, and may contain up to two unsaturated linkages per molecule. The hydrocarbons may also contain an adventitious minor proportion of sulphur and/or nitrogen in combined form.

We have now found that a treatment of the same hydrocarbon material by air blowing results in improvement in certain of the properties of the final polymer, and particularly the resistance to flexing at low temperature, of the resulting polyvinyl chloride compositions.

Mineral oil fractions, which term is intended to include mineral oil residues, as hereinbefore described are first extracted with a selective polar solvent, which term is intended to include a mixture of selective solvents one at least of which is of a polar character. The desired hydrocarbons are to be found in the extract phase and are recovered by the removal of the solvent, advantageously by distillation. The extract hydrocarbons thus obtained are according to the present invention air-blown at a moderately elevated temperature, and the resulting material may then be incorporated in polyvinyl chloride or co-polymer compositions as a filler or as a filler and plasticiser either alone or with known plasticisers.

The solvent extraction step may be carried out according to known methods. We have found that a mixture of sulphur dioxide and benzene gives successful results, but a wide range of other known solvents may also be advantageously used, as for example, sulphur dioxide, alcohols, furfural or phenols.

The air-blowing may be carried out for periods of from about 5 hours up to 50 hours or even longer at a temperature within the range 150 to 300° C., and preferably within the range 190 to 250° C. The air-blowing may be carried out under super-atmospheric pressure, but in general it is advantageous to operate at atmospheric pressure.

The treated extract material may be processed in known manner, for example by distillation, partial absorption on porous earths or similar materials, or precipitation with solvents or otherwise, with the object of rendering the material lighter in colour, before its incorporation into compositions as hereinbefore described.

The resulting compositions when the treated extract hydrocarbons are used as plasticisers and/or fillers, or when incorporated with known plasticisers show marked improvement in low temperature resistance of the resulting polyvinyl chloride compositions, as compared with the compositions prepared in the use of extract hydrocarbons in accordance with the process of the co-pending application Serial No. 513,468. Improvement in electric properties may also result from the use of air-blown material in place of untreated extract material, and by varying the formulation, to take advantage of the improved low temperature flexibility, still further improvement in electrical properties may result.

By varying the proportions in the final composition, it is also possible to improve the electrical properties of the finished polyvinyl chloride composition.

The following Examples 1, 3 and 5 illustrate the preparation of the air-blown material, for use according to the invention, while the following Examples 2, 4 and 6 indicate the improvement in properties resulting from the use of air-blown material as against the untreated material.

*Example 1.*—A mineral oil fraction boiling in the approximate range 435–485° C. at 760 mm. Hg pressure was submitted to multiple-stage, counter-current extraction with a mixture of sulphur dioxide and benzene in the ratio of 85 parts by vol. of sulphur dioxide to 15 parts by vol. of benzene employing a total proportion of the mixture amounting to 200% by volume of the mineral oil fraction, and employing a temperature gradient during extraction of 140 to 25° F. The extract hydrocarbons after evaporation of benzol and sulphur dioxide amounted to 30% by weight of the original mineral oil fraction and had a specific gravity at 60° F. of 1.013.

The material prepared according to the method above described was heated for 8 hours at 195–200° C. and a gentle stream of air passed through the material at atmospheric pressure, ensuring effective distribution of the air stream. The product had a specific gravity at 60° F. of 1.028.

*Example 2.*—This example illustrates the improvement in low-temperature flexibility obtained by the use of the treated instead of the untreated extract hydrocarbons and at the same time shows that an improvement in electrical loss factor may also be obtained.

25 parts by weight of the air-blown extract hydrocarbons prepared according to Example 1 were mixed with 100 parts by weight of polyvinyl chloride, 25 parts by weight of dibutyl phthalate, 4 parts by weight of lead silicate and 2 parts by weight of ethyl palmitate in an internal mixer for 20 minutes at 120° C., after which the mixture was transferred to a roll mill and milled for 20 minutes at 140° C. The sheet of plasticised material thus obtained was moulded under pressure at 150° C. to 0.05 inch thickness.

The properties of the composition so prepared are given in the following table in comparison with those of a product obtained in the use of the untreated extract hydrocarbons.

| Determinations | Untreated Extract hydrocarbons | Air-blown Extract hydrocarbons |
|---|---|---|
| Tensile Strength, lb./sq. in | 2820 | 3270 |
| Elongation at break, per cent | 260 | 250 |
| Shore Hardness | 83 | 80 |
| Low temperature flexibility limit, °C | −25 | −35 |
| Volume resistivity, ohm-cm | $1.1 \times 10^{14}$ | $1.3 \times 10^{14}$ |
| Specific Inductive Capacity: | | |
| 50 c. p. s | 4.39 | 4.27 |
| 800 c. p. s | 3.50 | 3.49 |
| Loss Factor: | | |
| 50 c. p. s | 0.096 | 0.088 |
| 800 c. p. s | 0.080 | 0.076 |

*Example 3.*—A mineral oil fraction boiling in the approximate range 435–485° C. at 760 mm. Hg pressure was submitted to multiple-stage, counter-current extraction with a mixture of sulphur dioxide and benzene in the ratio of 85 parts by volume of sulphur dioxide to 15 parts by volume of benzene, employing a total proportion of the mixture amounting to 200% by volume of the mineral oil fraction and employing a temperature gradient during extraction of 140 to 25° F. The material extracted, after evaporation of benzol and sulphur dioxide, amounted to 30% by weight of the original mineral oil fraction and had a specific gravity at 60° F. of 1.013. The material prepared according to the method described was heated for 24 hours at 195–200° C. and a gentle stream of air passed through the material at atmospheric pressure in such a manner that effective distribution of the air stream was achieved. The product had a specific gravity at 60° F. of 1.061.

*Example 4.*—This example illustrates the improvement in electrical properties which may result when air-blown material is employed in place of untreated material.

Twenty-five parts by weight of the air-blown material prepared according to Example 3 were mixed with 100 parts by weight of polyvinyl chloride, 25 parts by weight of dibutyl phthalate, 4 parts by weight of lead silicate and 2 parts by weight of ethyl palmitate in an internal mixer for 20 minutes at 120° C. after which the mixture was transferred to a roll mill and milled for 20 minutes at 140° C. The sheet of plasticised material thus obtained was moulded under pressure at 150° C. to 0.05 inch thickness. The properties of the composition so prepared are indicated in the following table in comparison with those of a product obtained in the use of the untreated material:

| Determinations | Untreated Extract hydrocarbons | Air-blown Extract hydrocarbons |
|---|---|---|
| Low Temperature Crack Point, °C | −25 | −35 |
| Volume Resistivity, ohm-cm | $1.1 \times 10^{14}$ | $6.03 \times 10^{14}$ |
| Specific Inductive Capacity: | | |
| 50 c. p. s | 4.39 | 3.83 |
| 800 c. p. s | 3.50 | 3.47 |
| Loss Factor: | | |
| 50 c. p. s | 0.096 | 0.062 |
| 800 c. p. s | 0.080 | 0.050 |

*Example 5.*—A mineral oil fraction boiling in the approximate range 435–485° C. at 760 mm. Hg pressure was submitted to multiple-stage counter-current extraction with a mixture of sulphur dioxide and benzene in the ratio of 85 parts by volume of sulphur dioxide to 15 parts by volume of benzene, employing a total proportion of the mixture amounting to 200% by volume of the mineral oil and employing a temperature gradient during extraction of 140 to 25° F. The material extracted, after evaporation of benzol and sulphur dioxide, amounted to 30% by weight of the original mineral oil fraction and had a specific gravity of 1.013. The material prepared as described was heated at 195–200° C. and a gentle stream of air passed through the material at atmospheric pressure in such a manner that effective distribution of the air stream was achieved. The treatment with air was continued until the specific gravity at 60° F. of the product was 1.027.

*Example 6.*—This example illustrates the improvement in electrical properties which may be achieved by the use of air-blown material rather than the untreated hydrocarbon material when compounding is altered to utilise the superior low temperature flexibility of compositions containing air-blown material and indicates the properties of a composition (I) containing 25 parts by weight of untreated hydrocarbon material to each 100 parts by weight of polyvinyl chloride and 25 parts by weight of dibutyl phthalate in comparison with the properties of a composition (II) containing 27.5 parts by weight of air-blown material prepared as in Example 5 per 100 g. of polyvinyl chloride and 22.5 parts by weight of dibutyl phthalate.

| Determinations | I | II |
|---|---|---|
| Low Temperature Crack Point, °C | −25 | −25 |
| Volume Resistivity, ohm-cm | $1.1 \times 10^{14}$ | $5.0 \times 10^{14}$ |
| Specific Inductive Capacity at— | | |
| 50 c. p. s | 4.39 | 3.70 |
| 800 c. p. s | 3.50 | 3.30 |
| Loss Factor at— | | |
| 50 c. p. s | 0.096 | 0.057 |
| 800 c. p. s | 0.080 | 0.048 |

We claim:

1. The composition of matter of improved low temperature flexibility and electrical properties comprising an intimate admixture of a polymeric substance selected from the group consisting of polyvinyl chloride, vinyl chloride-vinyl acetate co-polymer, vinyl chloride-methyl acrylate co-polymer and vinyl chloride-vinylidene chloride co-polymer and with an air-blown hydrocarbon material prepared by the air-blowing for a prolonged period of from about 5 hours up to 50 hours at a moderately elevated temperature within the range 150–300 °C. of extract hydrocarbons derived from a mineral oil fraction by solvent extraction with a selective polar solvent, the extracted hydrocarbons containing up to two unsaturated linkages per molecule and having a carbon content of on average at least .6 atom of carbon per atom of hydrogen, the molecular weight of the hydrocarbons being in the range of from about 200 to about 800, and the initial and final boiling points being in the range of from about 250° C. to about 800° C. at 760 mm. Hg pressure.

2. The composition of matter as specified in claim 1 in which the molecular weight of the hydrocarbons is in the range of from about 250 to about 750.

3. The composition of matter as specified in claim 1 in which the period of air-blowing is from about 5 hours up to about 50 hours at a temperature within the range of from about 190 to about 250° C.

4. A process for the production of vinyl polymer plastic compositions of improved low temperature flexibility and improved electrical properties comprising intimately incorporating at an elevated temperature a polymeric substance selected from the group consisting of polyvinyl chloride, vinyl chloride-vinyl acetate co-polymer, vinyl chloride-methyl acrylate co-polymer and vinyl chloride-vinylidene chloride co-polymer with air-blown hydrocarbons which have been produced by extracting from mineral oil fractions with a selective solvent, hydrocarbons of molecular weight in the range 200–800, having initial and final boiling points within the range 250–800° C. at 760 mm. of mercury pressure, containing up to two unsaturated linkages per molecule and having a carbon content of on average at least 0.6 atom of carbon per atom of hydrogen, and by air-blowing the extracted hydrocarbons at a temperature within the range 150°–300° C. for a period of from about 5 hours to about 50 hours.

5. A process of producing plastic compositions as specified in claim 4 in which the air-blown hydrocarbons have been produced by air-blowing at a temperature within the range 190–250° C.

6. A process of producing plastic compositions as specified in claim 5 in which the air-blown hydrocarbons are of molecular weight in the range 250–750.

ERIC WILLIAM MUSTHER FAWCETT.
ERIC SYLVESTER NARRACOTT.
KATHLEEN JOAN ROWLAND.

REFERENCES CITED

The following references are of record in the file of this patent:

UNITED STATES PATENTS

| Number | Name | Date |
| --- | --- | --- |
| 2,217,988 | Lawson et al. | Oct. 15, 1940 |
| 2,337,339 | McCluer et al. | Dec. 21, 1943 |
| 2,350,007 | Zerbe | May 30, 1944 |

FOREIGN PATENTS

| Number | Country | Date |
| --- | --- | --- |
| 562,956 | Great Britain | July 24, 1944 |